M. S. FULLER.
FASTENING DEVICE.
APPLICATION FILED DEC. 21, 1910.

1,039,045.

Patented Sept. 17, 1912.

WITNESSES
George Bambay.
F. A. Hoster

INVENTOR
Milo S. Fuller
BY Munn & Co.
ATTORNEYS

UNITED STATES PATENT OFFICE.

MILO STEPHEN FULLER, OF ONEONTA, NEW YORK.

FASTENING DEVICE.

1,039,045.  Specification of Letters Patent.  Patented Sept. 17, 1912.

Application filed December 21, 1910. Serial No. 598,554.

*To all whom it may concern:*

Be it known that I, MILO S. FULLER, a citizen of the United States, and a resident of Oneonta, in the county of Otsego and State of New York, have invented a new and Improved Fastening Device, of which the following is a full, clear, and exact description.

My invention is a fastening device for the ends of cords or ropes, and may be used to secure bundles, bales or anything else for which cord or rope is required.

The construction of the fastening device includes a body having a slot formed in one extremity thereof and having a guiding member or projection formed adjacent the slot, so that the end of the cord to be fastened can first be passed around the projection and then back into the slot at the extremity of the fastening device, to have a wedging engagement therewith.

Reference is to be had to the accompanying drawings forming a part of this specification, in which the same characters of reference indicate the same parts in all the views.

Figure 1:
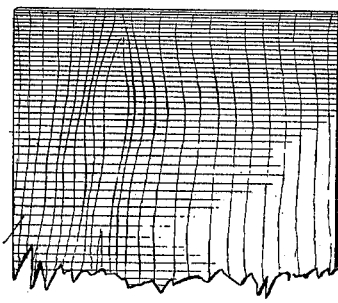
Figure 2:
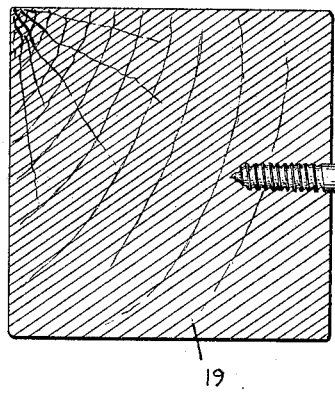
Figure 3:
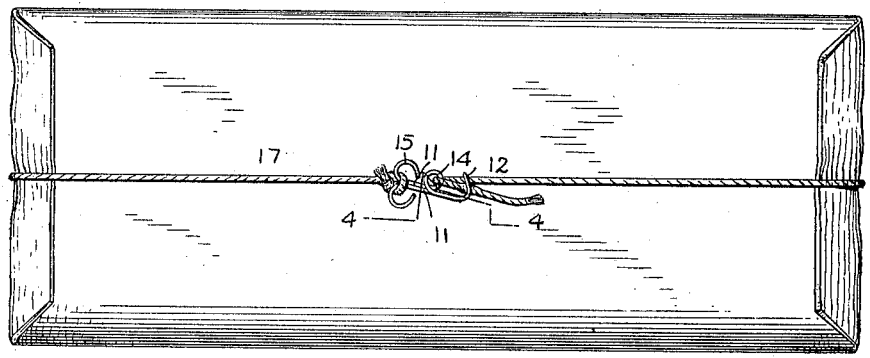
Figure 4:
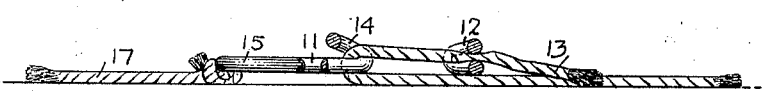

Figure 1 is a side elevation showing my device secured to a screw eye attached to a board and with a string releasably clamped in the said fastening device; Fig. 2 is a plan view of the device shown in Fig. 1; Fig. 3 is a plan view of a package or wrapper having a binder secured thereto by means of a modified form of my invention; and Fig. 4 is a sectional view taken on the line 4—4 in Fig. 3.

Referring particularly to the above-named figures, the fastening device in question is preferably made of a single piece of wire 10. This wire is bent midway of its length to form spaced parallel shanks 11, and the connected ends of these shanks are bent downward to form a depending clamping hook 12. One of the shanks is bent adjacent the clamping hook 12 to form a hook or projection in the shape of a guiding eyelet 14; and the opposite ends of the two shanks are bent back upon themselves to form attaching eyes 15 and 16, to secure the fastener to a hook or other suitable support, or to one end of a cord or rope if desired.

It will be observed from an inspection of Fig. 1, that the eyelet or projection 14 extends to one side of the plane of the shanks 11, and that the hook 12 makes an acute angle with the shanks of the fastener, and projects to the same side of the plane of the shanks as the eyelet aforesaid. The clamping hook 12 is bent back toward the eyelet; and it will be understood that normally the shanks are spaced a slight distance apart, so that the end of the cord to be secured, when passed between the bent-over ends of the shanks 11 forming the hook 12 will be clamped or wedged between these bent-over extremities.

In use, the body of the fastening device is secured by means of the eyes 15 and 16, to a screw-eye 18, or some other form of hook; or my fastener can be anchored in place by passing of a rope or cord through these eyes 15 and 16, if desired.

To secure the end of a rope or cord by means of the fastener, the end of the rope or cord is carried past the clamping hook 12, and through the eye or projection 14, and then bent back upon itself. It is then slipped between the extremities forming the clamping hook 12, and these extremities clamp it tightly enough to prevent it from slipping out. As soon as the cord 13 is pulled, the shanks 11 will be swung out of line with the cord 13, owing to the engagement of the cord with the projection 14, the effect being such as to move the body of the fastening device around the hooks or eyes 15 and 16 as a pivot. This movement will bring the end of the clamping hook 12 substantially in line with the cord 13, the clamping hook in this position making an acute angle with the line of the cord as well as with the shanks 11, and a further pull on the cord will only cause the end of the cord 13 to slip farther in between the extremities of the shanks 11 forming the hook 12, and wedge it into tighter engagement therewith.

In the form shown in Fig. 4, the attaching eyes 15 and 16 are formed by bending the ends of the shanks 11 laterally instead of downward, and one end of a cord is fastened to the device by passing it through these two eyes. This form is adapted for cords or ropes used to secure bales or bundles. It is shaped to rest upon the top of a bale or bundle, and when the end of a cord is passed through the guide or projection 14, the fastener moves sidewise to a slight extent, to bring the end of the clamping hook 12 in line with the cord, as before.

It will be observed that the connected ends of the shanks 11, bent in the manner above described, form in effect a longitudinally-slotted hook. This hook and the guiding projection 14 are both located on the same side of the fastening device; and the end of the cord to be fastened, after being passed around the guiding projection is simply slipped into the slotted hook and is held fast by coming into engagement with the sides thereof.

It will be understood that the shanks are normally set very close together, so that the sides of the extremities forming the clamping hook 12 will grip the end of the cord 13 at a point very close to the main portions of the shanks, and that the more the cord is drawn away from the main portions of the shanks 11, the tighter will it be held by the hook 12.

From the above it will be apparent that the body of the clamping hook will lie out of line with the cord end, and that the function of the projection or guide 14 is simply to keep the inclined clamping hook 12 in such a position that, when the cord 13 is pulled, the end thereof can slip down far enough toward the end of the clamp to be held tightly and prevent it from slipping.

Having thus described my invention, I claim as new and desire to secure by Letters Patent:

A fastening device consisting of parallel members having their ends bent over to form a clamping hook, said bent-over ends converging together to receive the end of a cord or rope between them, one of said members having a guiding projection adjacent the hook, the said projection and the said hook being located on the same side of said members, and the said bent-over extremities forming an acute angle with said parallel members, whereby the end of a cord can be engaged with the projection and then slipped between the converging bent-over extremities of said parallel members, to be drawn into wedging engagement therewith when the cord is pulled taut.

In testimony whereof I have signed my name to this specification in the presence of two subscribing witnesses.

MILO STEPHEN FULLER.

Witnesses:
 EDITH SCOTT LUDLAM,
 A. Y. THOMPSON.

---

Copies of this patent may be obtained for five cents each, by addressing the "Commissioner of Patents, Washington, D. C."